(12) United States Patent
Fong et al.

(10) Patent No.: US 10,127,191 B2
(45) Date of Patent: Nov. 13, 2018

(54) SYSTEM, METHOD, AND RECORDING MEDIUM FOR DIFFERENTIATED AND PARTIAL FEATURE UPDATE IN ALTERNATING LEAST SQUARE

(71) Applicant: International Business Machines Corporation, Armonk, NY (US)

(72) Inventors: Liana Fong, Irvington, NY (US); Wei Tan, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 15/141,018

(22) Filed: Apr. 28, 2016

(65) Prior Publication Data

US 2017/0315959 A1    Nov. 2, 2017

(51) Int. Cl.
*G06F 17/17* (2006.01)
*G06F 17/16* (2006.01)

(52) U.S. Cl.
CPC .............. *G06F 17/17* (2013.01); *G06F 17/16* (2013.01)

(58) Field of Classification Search
None
See application file for complete search history.

(56) References Cited

U.S. PATENT DOCUMENTS 9,256,693 B2 *  2/2016  Nice ................. G06F 17/30876
2009/0299996 A1 * 12/2009  Yu ..................... G06F 17/30867
2012/0030159 A1    2/2012  Pilaszy et al.

FOREIGN PATENT DOCUMENTS

WO    WO 2014/143024 A1    9/2014

OTHER PUBLICATIONS

Anonymously; "Real Time Visual Recommendations"; http://ip.com/IPCOM/000226009D; Mar. 20, 2013.
Lee, C-H. et al.; "Method and System for Providing a Real Time Query Recommendation System"; http://ip.com/IPCOM/000239856D; Dec. 5, 2014.
Phan, AH. et al.; "Low rank tensor deconvolution"; 2015 IEEE International Conference on Acoustics, Speech and Signal Processing (ICASSP) Proceedings, pp. 2169-2173; IEEE; 2015.
Rutkowski, L. et al.; "Convex Nonnegative Matrix Factorization with Rank-1 Update for Clustering"; Artificial Intelligence and Soft Computing. 14th International Conference, ICAISC 2015, pp. 59-68; 2015.

* cited by examiner

*Primary Examiner* — Michael D. Yaary
(74) *Attorney, Agent, or Firm* — Rahan Uddin, Esq.; McGinn IP Law Group, PLLC

(57) ABSTRACT

An alternating least square recommendation method, system, and non-transitory computer readable medium, include receiving an existing sparse matrix factorization saved in a data store to incrementally update factorized features when users change ratings of the sparse matrix factorization, determining an update ratio based on the number of changed ratings of the sparse matrix factorization, and updating the users' features by using the existing content ratings of the existing sparse matrix factorization if the update ratio is less than a pre-defined threshold ratio.

20 Claims, 8 Drawing Sheets

SYSTEM, METHOD, AND RECORDING MEDIUM FOR DIFFERENTIATED AND PARTIAL FEATURE UPDATE IN ALTERNATING LEAST SQUARE

BACKGROUND

The present invention relates generally to an alternating least square (ALS) recommendation system, and more particularly, but not by way of limitation, to a system for real-time recommendations in alternating least square.

Conventionally, content providers collect user ratings on content watches and attempt to predict user ratings on content that the users have not watched by factorizing a rating matrix and minimizing empirical loss using a batch-based algorithm (i.e. alternating least square (ALS)) to literally solve for the ratings. However, batch-based algorithms take a long time to finish or refresh for the sizable data set that is typical of collected user ratings such that the updated ratings of the content is out of date when the batch-based algorithm finishes an update.

That is, there is a technical challenge in the conventional techniques that the conventional techniques do not exploit the nature of matrix factorization such that users are provided with expedited and still accurate recommendation by using the batch-based algorithms.

SUMMARY

The inventors have considered the technical challenge and realized that there is a significant need for a faster and more accurate approach to realize when to update, what to update, and how to update the batch-based algorithms to reflect user feature changes over time and deliver a fast and accurate result of the batch-based algorithm. Thus, the inventors have realized a technical solution to the technical challenge by configuring the batch-based algorithms to provide partial feature updates based on pre-configurable thresholds of the data in the batch-based algorithm. Therefore, the technical solution provides an accurate, honors user/item feature discrepancy, and is able to control when and where to update the data of the batch-based algorithm.

In an exemplary embodiment, the present invention can provide an alternating least square recommendation system including a receiving circuit configured to receive an existing sparse matrix factorization saved in a data store to incrementally update factorized features when users change ratings of the sparse matrix factorization and a first updating circuit configured to determine an update ratio based on the number of changed ratings of the sparse matrix factorization and to update the users/items features by using the existing content ratings of the existing sparse matrix factorization if the update ratio is less than a pre-defined threshold ratio.

Further, in another exemplary embodiment, the present invention can provide an alternating least square recommendation method including receiving an existing sparse matrix factorization saved in a data store to incrementally update factorized features when users change ratings of the sparse matrix factorization, determining an update ratio based on the number of changed ratings of the sparse matrix factorization, and updating the users/items features by using the existing content ratings of the existing sparse matrix factorization if the update ratio is less than a pre-defined threshold ratio.

Even further, in another exemplary embodiment, the present invention can provide a non-transitory computer-readable recording medium recording an alternating least square recommendation program, the program causing a computer to perform: receiving an existing sparse matrix factorization saved in a data store to incrementally update factorized features when users change ratings of the sparse matrix factorization, determining an update ratio based on the number of changed ratings of the sparse matrix factorization, and updating the users/items features by using the existing content ratings of the existing sparse matrix factorization if the update ratio is less than a pre-defined threshold ratio.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
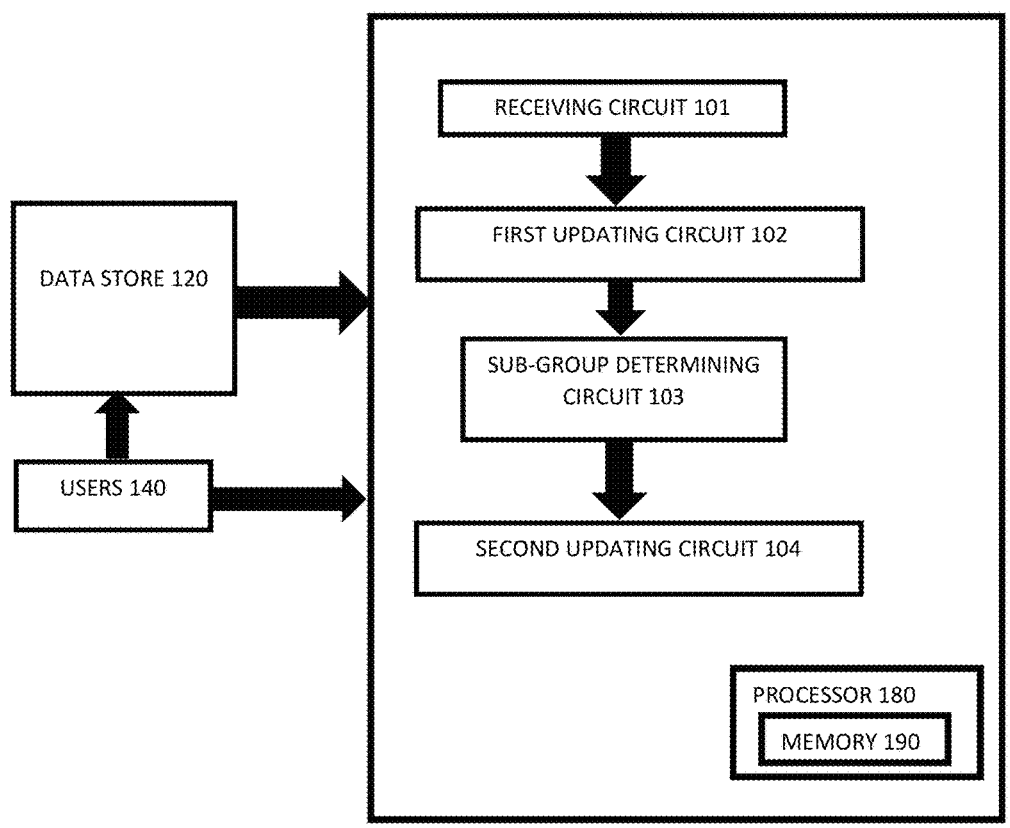
FIG. 1 exemplarily shows a block diagram illustrating a configuration of an alternating least square recommendation system 100.

The invention will now be described with reference to FIGS. 1-10, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the alternating least square recommendation system 100 includes a receiving circuit 101, a first updating circuit 102, a sub-group determining circuit 103, and a second updating circuit 104. The alternating least square recommendation system 100 includes a processor 180 and a memory 190, with the memory 190 storing instructions to cause the processor 180 to execute each circuit of alternating least square recommendation system 100. The processor and memory may be physical hardware components, or a combination of hardware and software components.

Although the alternating least square recommendation system 100 includes various circuits, it should be noted that an alternating least square recommendation system can include modules in which the memory 190 stores instructions to cause the processor 180 to execute each module of alternating least square recommendation system 100.

Also, each circuit can be a stand-alone device, unit, module, etc. that can be interconnected to cooperatively produce a transformation to a result.

With the use of these various circuits, the alternating least square recommendation system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
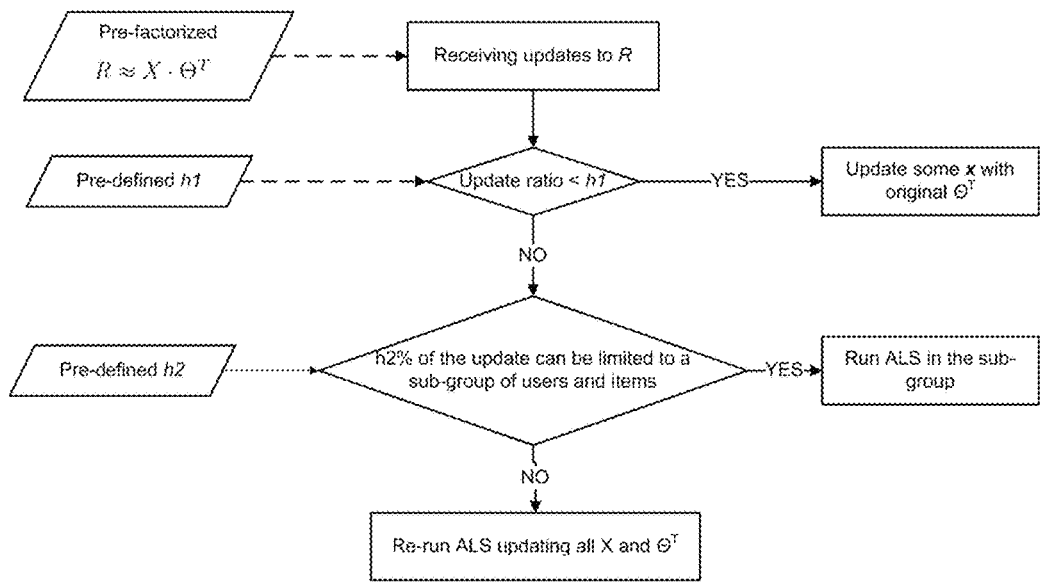
FIG. 3 exemplarily shows a flow chart for the alternating least square recommendation system 100.
Figure 4:
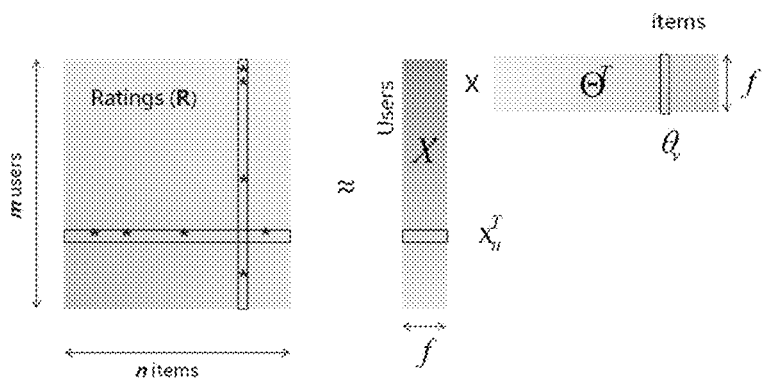
FIG. 4 exemplarily shows the matrices of the alternating least square algorithm.
Figure 5:
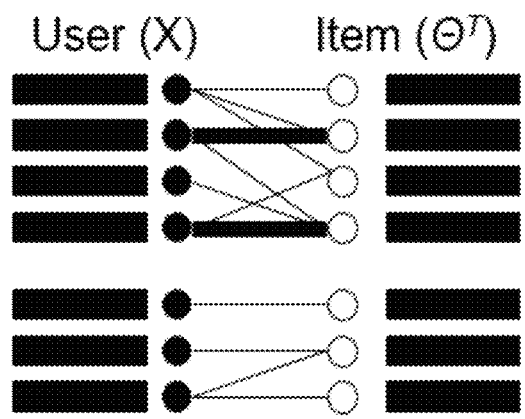
FIG. 5 exemplarily shows a first case of a threshold for updating.

Although as shown in FIGS. 3-5 and as described later, the computer system/server 12 is exemplarily shown in cloud computing node 10 as a general-purpose computing circuit which may execute in a layer the alternating least square recommendation system 100 (FIG. 5), it is noted that the present invention can be implemented outside of the cloud environment.

The data store 120 includes previous rating matrix 25 that is pre-factorized. As shown in FIG. 4, the batch-based algorithm solves for Ratings (R) for m users of n items. The matrix saved in the data store 120 assumed that $R \approx X \cdot \Theta^T$ where the meanings of the variables in FIG. 4 are shown in TABLE 1 below.

TABLE 1

| Name | Meaning |
|---|---|
| R | sparse rating matrix: m by n |
| X | low rank matrix: m by f |
| Θ | low rank matrix: n by f |
| m | vertical dimension of R |
| n | horizontal dimenstion of R |
| f | dimension of latent features |
| $x_u^T$ | X's uth row; 1 ≤ u ≤ m |
| $\theta_v$ | $\Theta^T$'s vth column; 1 ≤ v ≤ n |

Referring to FIG. 1 and FIG. 3, users 140 can add ratings for different content or update ratings for previously rated content (i.e., updated ratings) and the receiving circuit 101 receives the updated ratings to R in the matrix 25.

The first updating circuit 102 determines an update ratio based on the number of updated ratings in R versus the total number of ratings in R. If a number of the updated ratings is less than a pre-defined threshold ratio "h1" (i.e., a "first case"), then the first updating circuit 102 updates some X by using the original $\Theta^T$. FIG. 5 exemplarily shows the first case in which the two users (as shown in bold) have updated two items as shown by reference numerals 51 and 52. Therefore, the number of updated ratings is less than the pre-defined threshold ratio "h1".

In other words, if the number of updated ratings is less than the pre-defined threshold ratio "h1", the items of the matrix 25 are unlikely to significantly change (i.e., the item features are more stable) whereas the ratings input by the user X will change (i.e., user features are more volatile and change over time). Therefore, the first updating circuit 102 can efficiently re-calculate corresponding X matrix by keeping OT using the below equation (1).

$$\sum_{r_{uv} \neq 0} (\theta_v \theta_v^T + \lambda I) \cdot x_u = \Theta^T \cdot R_{u*}^T \qquad (1)$$

The threshold ratio "h1" is determined based on past experiences of calculating the matrix values by setting different threshold values and conducting A/B testing to compare the accuracy and speed of the partial-update and a full-update. That is, the threshold value is dynamically set to achieve a particular accuracy at a given speed. For example, the threshold ratio in the first case can be a 5% change in values of the data store 120.

Figure 6:
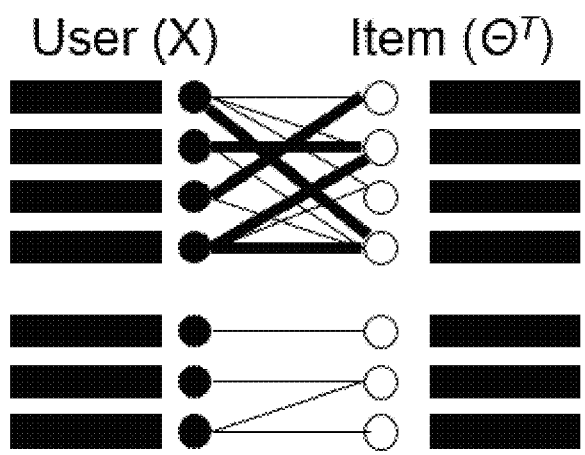
FIG. 6 exemplarily shows a second case of a threshold for updating.

As shown in FIG. 3, if the number of updated ratings are greater than the pre-defined threshold ratio "h1", the sub-group determining circuit 103 groups the users and the items together to form a sub-group. For example, if every user from China updates each item that is delivered in Mandarin and no user from any other region updates any items that are delivered in Mandarin, then the sub-group determining circuit 103 groups each of the users from China and each of the Mandarin content together into a sub-group as shown in FIG. 6.

Based on the sub-group, the second updating circuit 104 runs the ALS algorithm to update the sub-group to calculate the new items and user values starting from the old item and user values of the matrix 25 (i.e., a "second case"). The second updating circuit 104 uses equations (2) and (3) below to calculate the new items and user values. This update using (2) and (3) can take multiple iterations until converge, same as the batch-ALS does.

$$\sum_{r_{uv} \neq 0} (\theta_v \theta_v^T + \lambda I) \cdot x_u = \Theta^T \cdot R_{u*}^T \quad (2)$$

$$\sum_{r_{uv} \neq 0} (x_u x_u^T + \lambda I) \cdot \theta_v = X^T \cdot R_{*v} \quad (3)$$

That is, for some items, the updated ratings that the items receive is higher than the predefined threshold ratio "h1" but the updated ratings can be grouped into a sub-group to limit the amount of updates and create a smaller data set to partially update the matrix 25 using the ALS algorithm.

The ALS algorithm would calculate the user ratings and then reverse calculate the item ratings with the calculated user ratings using the above equations (2) and (3).

Figure 7:
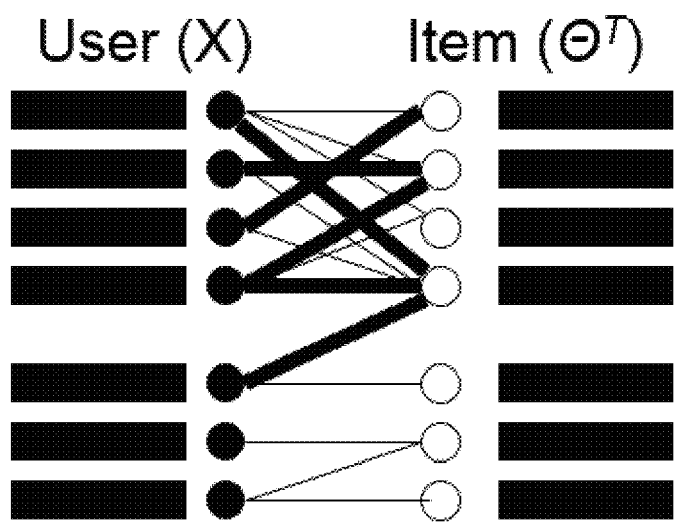
FIG. 7 exemplarily shows a third case of a threshold for updating.

Further, if some users outside of the sub-group update the items as shown in FIG. 7, the second updating circuit 104 determines if the users and items updated of the sub-group versus (i.e., as compared to) the total users and the items updated are greater than a pre-defined threshold ratio "h2". As shown in FIG. 7, all of the updates occur in the sub-group except for one user. The second updating circuit 104 determines that this situation is a third case in which the users and items in the sub-group are greater than a pre-defined threshold ratio of the entire amount of users and items updated.

The second-updating circuit 104 runs the ALS algorithm on the sub-group of users and items the same as in the second case.

Similar to the pre-defined threshold ratio "h1", the pre-defined threshold ratio "h2" is calculated based on past experiences and a balance of accuracy and speed in a partial update.

It is noted that if the alternating least square recommendation system 100 does not classify that the updates to the matrix 25 create the first case, the second case, or the third case such that the first updating circuit 102 or the second updating circuit 104 can partially update the matrix, the system 100 recommends that a full update is run on the matrix 25 in the data store 120.

Thus, the system 100 starts from an existing sparse matrix factorization "R" such that $R \approx X \cdot \Theta^T$, to periodically and incrementally update the factorized features ("X" and "$\Theta^T$") when users add/change ratings into "R", after a given period of time. When the aggregated number of rating addition(s)/change(s) is small and under a pre-defined threshold ratio (e.g., <5%) per item, the existing $\Theta^T$ is used to re-calculate corresponding X using the equation (1) above. Otherwise, when the aggregated number of rating addition(s)/change(s) is large per item, e.g., >5%, the system 100 checks if the new ratings mostly, e.g., 95%, occur in a sub-group of users and a sub-group of items. If "Yes", the system 100 performs ALS (in iterations) only in the subgroup $X_{sub}$ and $\Theta^T_{sub}$, starting from the old X and $\Theta^T$ values using equations (2) and (3). Otherwise, ALS is re-run to update X and $\Theta^T$ for the whole dataset.

Figure 2:
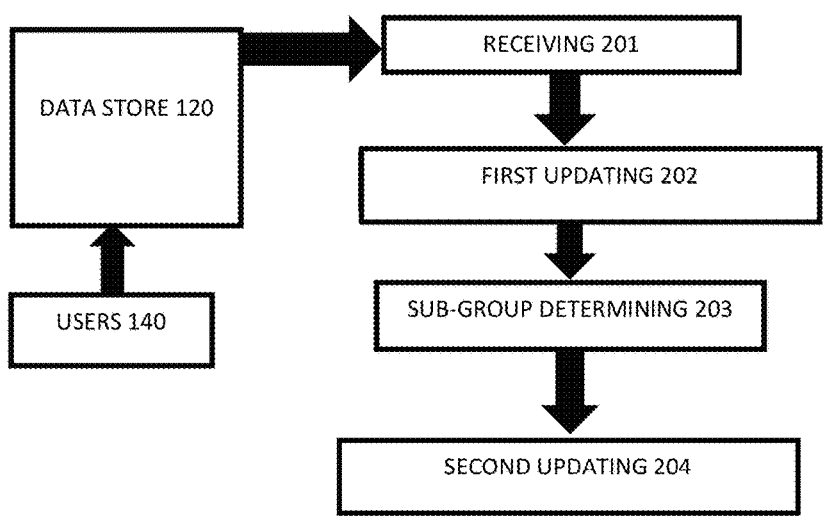
FIG. 2 exemplarily shows a high level flow chart for an alternating least square recommendation method 200.

FIG. 2 shows a high level flow chart for a method 200 of alternating least square recommendation.

Users 140 can add ratings for different content or update ratings for previously rated content (i.e., updated ratings) and Step 201 receives the updated ratings to R in the matrix 25 from the data store 120.

Step 202 determines an update ratio based on the number of updated ratings in R versus the total number of ratings in R. If a number of the updated ratings is less than a pre-defined threshold ratio "h1" (i.e., the "first case"), then Step 202 updates some X by using the original $\Theta^T$. FIG. 5 exemplarily shows the first case in which the two users (as shown in bold) have updated two items. Therefore, the updated ratings is less than the pre-defined threshold ratio "h1".

If the updated ratings is greater than the pre-defined threshold ratio "h1", then Step 203 groups the users and the items together to form a sub-group. For example, if every user from China updates each item that is delivered in Mandarin and no user from any other region updates any items that are delivers in Mandarin, Step 203 groups each of the users from China and each of the Mandarin content together into a sub-group, as shown in FIG. 6.

Based on the sub-group, Step 204 runs the ALS algorithm to update the sub-group to calculate the new items and user values starting from the old item and user values of the matrix 25 (i.e., a "second case"). The second updating circuit 104 uses equations (2) and (3) above to calculate the new items and user values.

If some users outside of the sub-group update the items as shown in FIG. 7, then the Step 204 determines if the users and items updated of the sub-group versus (i.e., compared to) the total user and items updated are greater than a pre-defined threshold ratio "h2". As shown in FIG. 7, all of the updates occur in the sub-group except for one user. Step 204 determines that this situation is a third case in which the users and items in the sub-group are greater than a pre-defined threshold ratio of the entire amount of users and items updated. Then, Step 204 runs the ALS algorithm on the sub-group of users and items the same as in the second case.

It is noted that the pre-defined threshold ratio can be determined based on past updates of the matrix. For example, the ALS algorithm is run on the matrix with variable threshold values (i.e., 1%, 2%, 3%, . . . 10% and so on) and the results are compared to the results of a full update on the entire matrix. The threshold ratio value that obtains the most accurate results and has a fastest update time is chosen. That is, a programmer may weigh accuracy vs. speed and determine which threshold ratio value to use.

Further, the updating by the first updating circuit 102 and the second updating circuit 104 can be performed on a plurality of graphical processing units (GPUs) in order to speed up the calculation.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
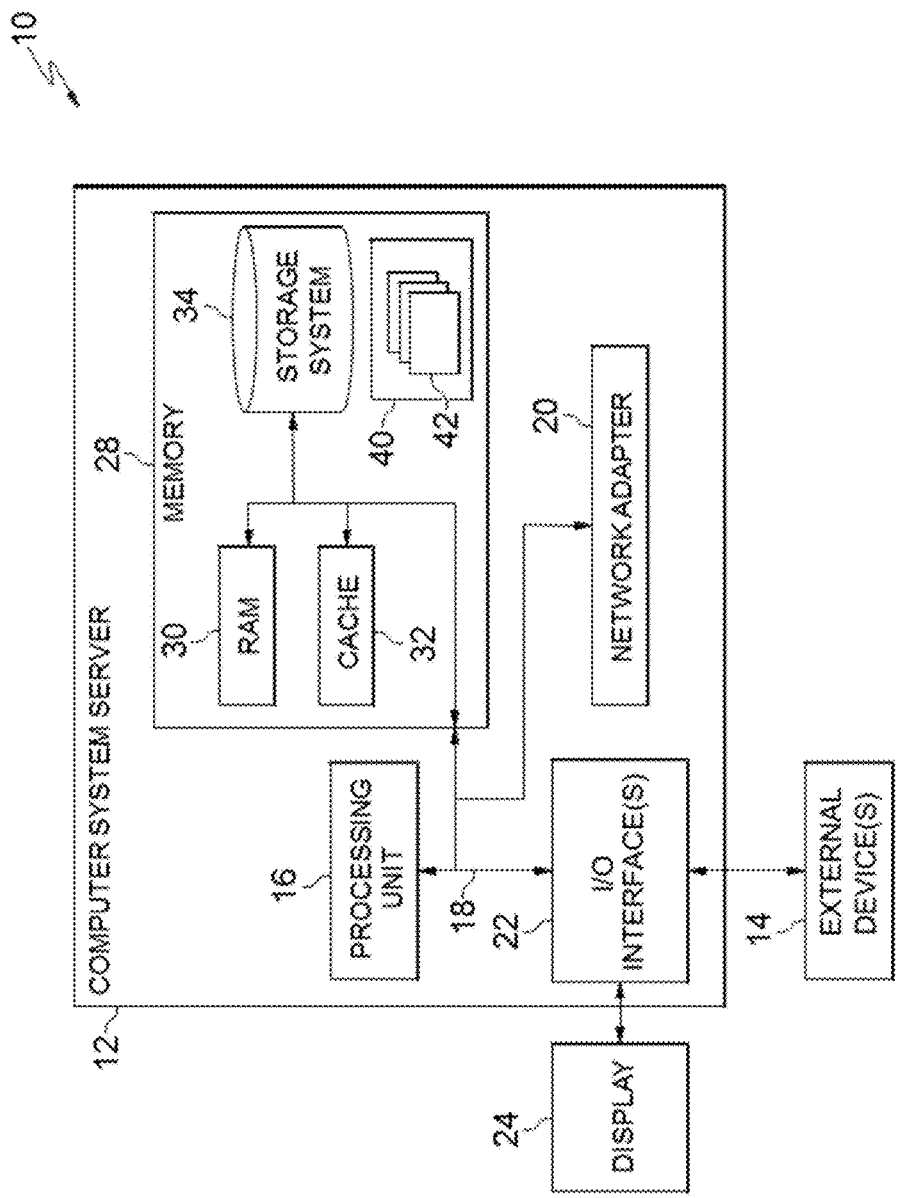
FIG. 8 depicts a cloud computing node 10 according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 8, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 9:
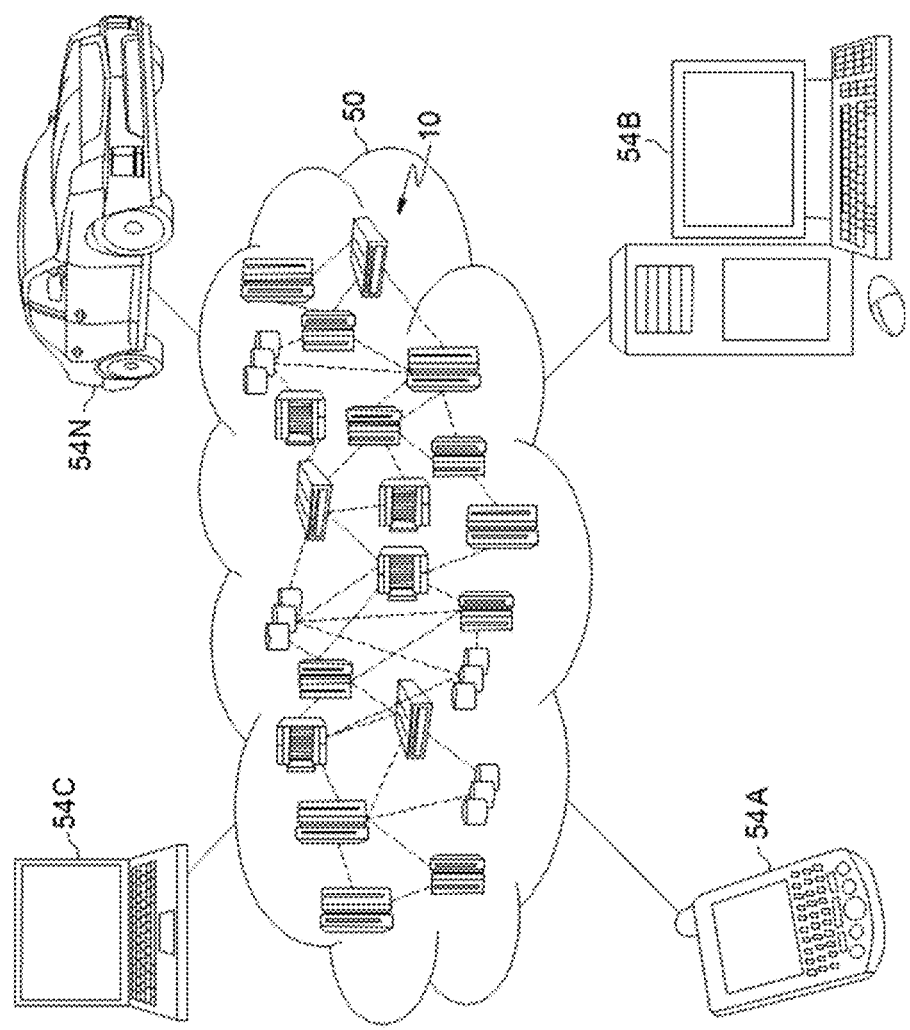
FIG. 9 depicts a cloud computing environment 50 according to another embodiment of the present invention.

Referring now to FIG. 9, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 10:
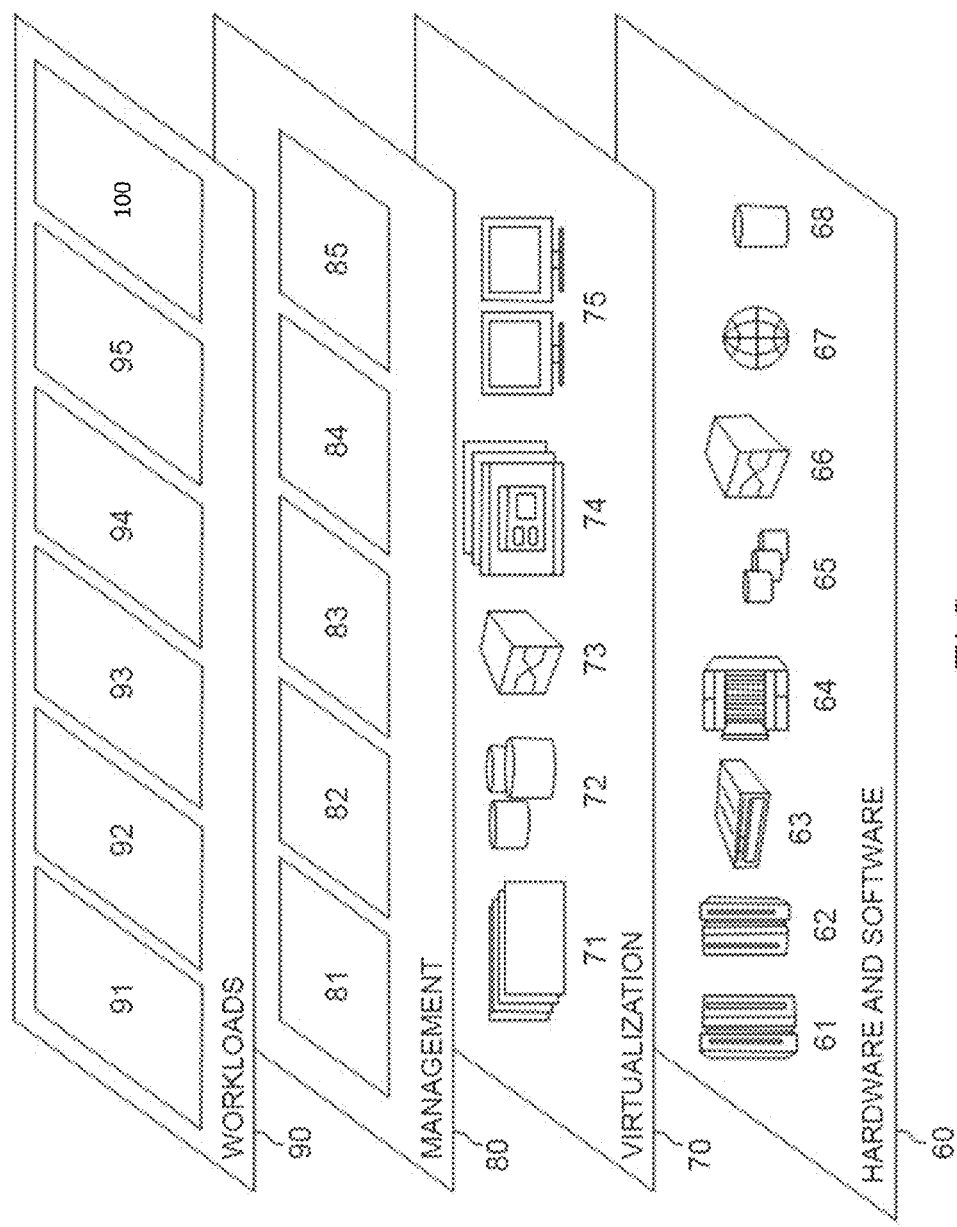
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and data store software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the alternating least square recommendation system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An alternating least square recommendation system comprising:
    a receiving circuit configured to receive an existing sparse matrix factorization saved in a data store to incrementally update factorized features when users change ratings of content of the existing sparse matrix factorization; and
    an updating circuit configured to determine an update ratio based on a number of changed ratings of the sparse matrix factorization and to update the users' features by using the existing content ratings of the existing sparse matrix factorization if the update ratio is less than a pre-defined threshold ratio,
    wherein the updating circuit partially updates the users' features when the update ratio is less than the pre-defined threshold ratio, the pre-defined threshold ratio being configurable based on a preference of the existing sparse matrix factorization, and
    wherein, when the number of changed ratings of the sparse matrix factorization greater than the pre-defined threshold ratio, the updating circuit partially updates the users' features only if the new content rating occur in a sub-group of the users, and a sub-group of the items at a rate greater than a threshold value.

2. The system of claim 1, further comprising:
    a sub-group determining circuit configured to group the updated factorized features together to form the sub-group of the users and the content that has a ratings change if the update ratio is greater than the pre-defined threshold ratio; and
    a second updating circuit configured to update the factorized features of the sub-group if the sub-group includes all of the updated factorized features of the sparse matrix factorization.

3. The system of claim 2, wherein the second updating circuit is further configured to update the factorized features of the scab-group if a ratio of the users and the content of the sub-group to a total number of the updated factorized features is greater than a second pre-defined threshold ratio.

4. The system of claim 1, wherein the updating circuit updates only the users' factorized features of the sparse matrix factorization by setting the content ratings as a constant.

5. The system of claim 2, wherein the second updating circuit updates the sub-group to calculate new content features and new users features based on stored content ratings and users' ratings of the existing sparse matrix factorization.

6. The system of claim 1, wherein the first updating circuit updates the users' features using an alternating least square algorithm.

7. The system of claim 2, wherein the second updating circuit updates the users' features using an alternating least square algorithm.

8. The system of claim 1, wherein the pre-defined threshold ratio is pre-defined based on a past incremental update of the factorized features.

9. The system of claim 1, wherein the pre-defined threshold ratio is pre-defined based on accuracy of the update and a speed of the update.

10. The system of claim 3, wherein the pre-defined threshold ratio is pre-defined based on a past incremental update of the factorized features, and
    wherein the second pre-defined threshold ratio is pre-defined based on a past incremental update of the factorized features.

11. The system of claim 3, wherein the pre-defined threshold ratio is pre-defined based on accuracy of the update and a speed of the update, and
    wherein the second pre-defined threshold ratio is pre-defined based on accuracy of the update and a speed of the update.

12. The system of claim 1, wherein the pre-defined threshold ratio is pre-defined by setting the pre-defined threshold ratio to variable values and comparing a result of an update with each value to a result with a full-update, the value of the pre-defined threshold ratio having a highest accuracy being set as the pre-defined threshold ratio.

13. The system of claim 3, wherein the pre-defined threshold ratio is pre-defined by setting the pre-defined threshold ratio to variable values and comparing a result of an update with each value to a result with a full-update, the value of the pre-defined threshold ratio having a highest accuracy being set as the pre-defined threshold ratio, and
    wherein the second pre-defined threshold ratio is pre-defined by setting the second pre-defined threshold ratio to variable values and comparing a result of an update with each value to a result with a full-update, the value of the second pre-defined threshold ratio having a highest accuracy being set as the second pre-defined threshold ratio.

14. The system of claim 1, wherein the updating circuit updates the users' features using an alternating least square algorithm on a plurality of graphical processing units (GPUs).

15. The system of claim 3, wherein the second updating circuit updates the users' features using an alternating least square algorithm on a plurality of graphical processing units (GPUs).

16. An alternating least square recommendation method comprising:
    receiving an existing sparse matrix factorization saved in a data store to incrementally update factorized features when users change ratings of the sparse matrix factorization;
    determining an update ratio based on the number of changed ratings of the sparse matrix factorization; and
    updating the users' features by using the existing content ratings of the existing sparse matrix factorization if the update ratio is less than a pre-defined threshold ratio,
    wherein the updating partially updates the users' features when the update ratio is less than the pre-defined threshold ratio, the pre-defined threshold ratio being configurable based on a preference of the existing sparse matrix factorization, and wherein, when the number of changed ratings of the sparse matrix factorization is greater than the pre-defined threshold ratio, the updating partially updates the users' features only if the new content ratings occur in a sub-group of the users and a sub-group of the items at a rate greater than a threshold value.

17. The method of claim 16, further comprising:

determining a sub-group by grouping the updated factorized features together to form the sub-group of the users and the content that has a ratings change if the update ratio is greater than the pre-defined threshold ratio; and updating the factorized features of the sub-group if the sub-group includes all of the updated factorized features of the sparse matrix factorization.

18. The method of claim 17, wherein the updating the factorized features of the sub-group is further configured to update the factorized features of the sub-group if a ratio of the users and the content of the sub-group to a total number of the updated factorized features is greater than a second pre-defined threshold ratio.

19. A non-transitory computer-readable recording medium recording an alternating least square recommendation program, the program causing a computer to perform:

receiving an existing sparse matrix factorization saved in a data store to incrementally update factorized features when users change ratings of the sparse matrix factorization;

determining an update ratio based on a number of changed ratings of the sparse matrix factorization; and updating the users' features by using the existing content ratings of the existing sparse matrix factorization if the update ratio is less than a pre-defined threshold ratio, wherein the updating partially updates the users' features when the update ratio is less than the pre-defined threshold ratio, the pre-defined threshold ratio being configurable based on a preference of the existing sparse matrix factorization, and wherein, when the number of changed ratings of the sparse matrix factorization is greater than the pre-defined threshold ratio, the updating partially updates the users' features only if the new content ratings occur in a sub-group of the users and a sub-group of the items at a rate greater than a threshold value.

20. The non-transitory computer-readable recording medium of claim 19, further comprising:

determining a sub-group by grouping the updated factorized features together to form the sub-group of the users and the content that has a ratings change if the update ratio is greater than the pre-defined threshold ratio; and updating the factorized features of the sub-group if the sub-group includes all of the updated factorized features of the sparse matrix factorization.

* * * * *